Dec. 27, 1949 M. GOLBEN 2,492,421
VISCOSE PREPARATION
Filed March 31, 1945
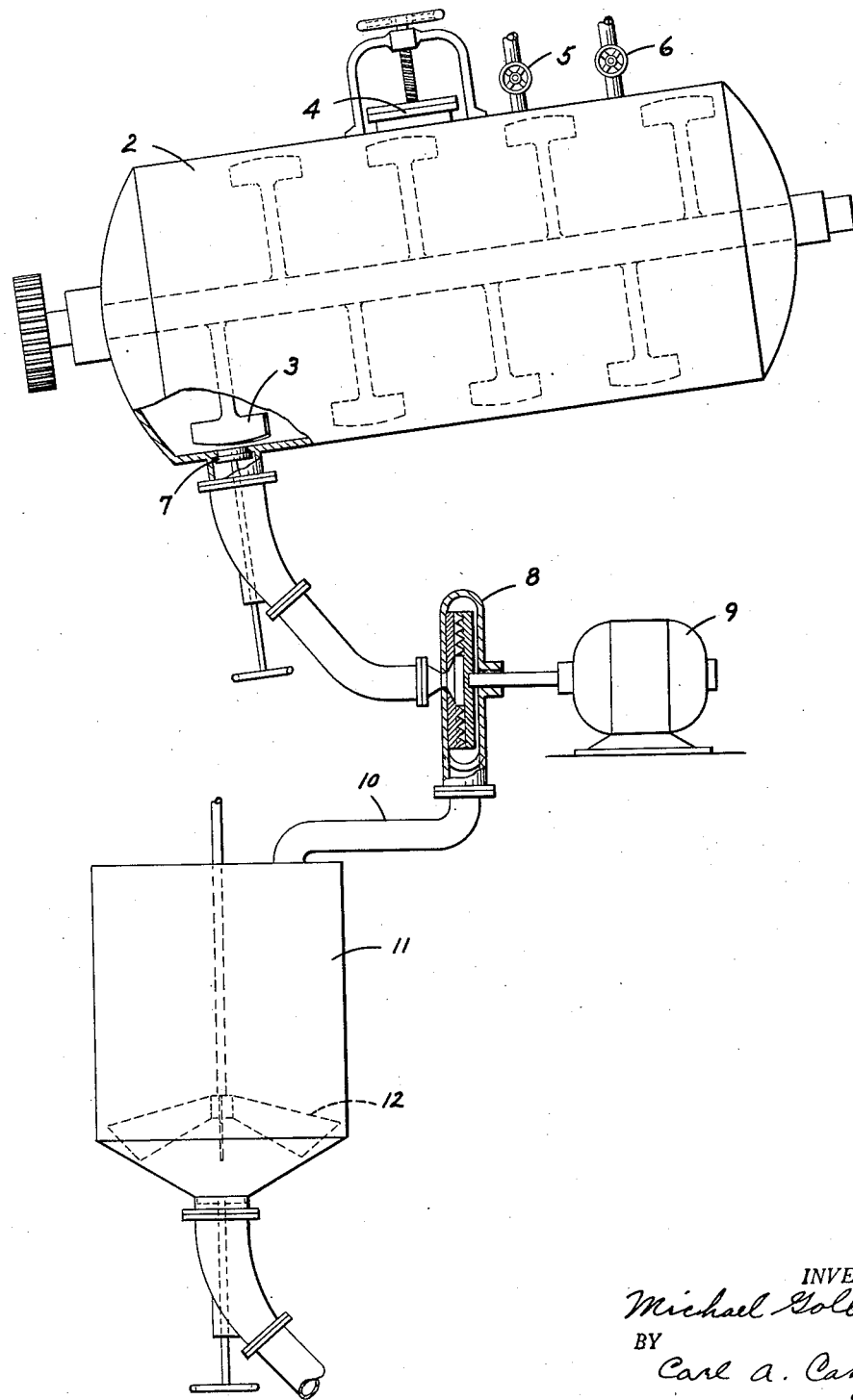
INVENTOR.
Michael Golben
BY
Carl A. Castellan
atty.

Patented Dec. 27, 1949

2,492,421

UNITED STATES PATENT OFFICE 2,492,421

VISCOSE PREPARATION

Michael Golben, Front Royal, Va., assignor to American Viscose Corporation, Wilmington, Del., a corporation of Delaware Application March 31, 1945, Serial No. 585,975

2 Claims. (Cl. 260—217)

This invention relates to the preparation of viscose and is particularly concerned with the conversion of the alkali cellulose xanthate crumbs into a viscose solution.

Although there are minor variations in the processes employed by different manufacturers, the preparation of viscose for use in the rayon and Cellophane industries is now fairly conventional. In general the cellulose (cotton linters, purified wood pulp, or the like) is impregnated (steeped) with concentrated aqueous sodium hydroxide to form alkali cellulose, the excess caustic soda solution squeezed out, the press cake shredded to crumbs, the crumbs aged (to degrade the cellulose) under controlled conditions (time, temperature, minimum exposure to carbon dioxide, oxygen, etc.) to provide inter alia for proper viscose viscosity, the aged crumbs treated with carbon bisulfide to produce sodium cellulose xanthate (a lumpy, orange-colored product varying from a mealy to a sticky consistency), the xanthate dissolved or dispersed in dilute aqueous caustic alkali, the solution or dispersion filtered and the resultant viscose ripened (aged) until suitable for extrusion and regeneration into filaments, films, etc.

Generally the xanthate is dissolved or dispersed by dumping it, together with dilute caustic alkali, into large specially designed vessels equipped with disintegrating agitators and stirring the mixture for several hours. The power required to dissolve a batch of xanthate in this operation is considerable. During the step of dissolving or dispersing in the caustic alkali solution, the crumbs tend to form sticky masses which ball up within the agitated caustic medium into lumps having extremely viscous surfaces which resist penetration of the alkali and consequently must be subjected to prolonged disintegration during dispersion before a satisfactory viscose solution is obtained from the standpoint of filterability and uniformity. This requires the expenditure of a great deal of mechanical energy and the provision of a large number of dissolvers for each xanthator in order to maintain a steady production of viscose to supply the spinning or other forming machines continuously.

The present invention is concerned with the improvement of the efficiency of the xanthate dispersing operation, so that dispersion is partially effected in the xanthator and the resulting slurry is transferred through a disintegrator to a separate dispersing vessel where dispersion is completed. Thus, only a single auxiliary vessel is needed to take care of the entire output of a xanthating vessel.

In general, the improved process of the present invention involves the addition of water to the sodium cellulose xanthate crumbs after their preparation in the xanthator by the customary process which involves the reaction of carbon disulfide with alkali cellulose crumbs generally containing from 12 to 20% of alkali while agitating. During the addition of the water, agitation is continued and the amount of water added is at least sufficient to produce a fluid slurry. This slurry is transferred by a pump through a disintegrating mill, preferably an attrition type of mill, to a mixing vessel in which it is agitated continuously. this is followed by one or more rinses with water or caustic solutions, at least the last of which has a concentration of 12 to 35% caustic soda and preferably has a higher concentration of caustic than the concentration of the alkali cellulose crumbs from which the xanthate is to be produced in the next batch. In a preferred specific embodiment, the amount of water and the amount of caustic used in making the preliminary slurry and in the rinses are predetermined to give the desired concentration of cellulose and alkali in the final viscose solution, so that when the slurry is combined with the rinses in the mixer, no additional caustic or dilution is needed to produce the desired viscose.

It has been found that dissolution of the xanthate crumbs is accomplished much more readily by first treating them with water to form a preliminary slurry. This preliminary handling with water prevents the formation of large balls and any aggregates formed are disintegrated by the attrition mill in an incipient stage, thereby preventing the development of a sticky outer surface on such aggregates which would prevent penetration of the dissolving medium and would result in the formation of large balls. The slurrying in water in the xanthator is preferably done very quickly, such as in a period of about 10 to 20 minutes for a 1,000 pound batch, so that the slurry is subjected to the attrition mill very soon after formation to break up any aggregates in an incipient stage.

After the slurry is discharged from the xanthator to the mixer, the xanthator is rinsed by the addition in one or more steps of a caustic solution. If a single rinse is preformed, it is preferred that the caustic solution have a high concentration from 12 to 35% and preferably somewhat above the concentration of the alkali in the alkali cellulose from which the next batch is to be formed. For example, if the alkali cellulose has a content of about 15%, a rinse solution having a caustic concentration of about 16 to 17% is preferred. It is desirable to rinse in several steps and for this purpose, the concentration of the caustic solutions used may vary for each rinse. Thus, the first rinse may have a low concentration of about 0 to 5% caustic but the last should have a concentration of 12 to 35%, again somewhat higher than the concentration of alkali in the alkali cellulose crumbs from which the next batch of xanthate is to be formed. Where more than two rinses are involved, those preceding the last may have the same concentration, but lower than that of the final rinse; the first rinse may be of greater concentration than the intermediate rinses or vice versa; or all of the rinses from first to last may have substantially the same caustic concentration, which in this case is preferably the same as or somewhat greater than the concentration of alkali in the alkali cellulose to be introduced into the xanthate for the next batch.

The rinses operate upon any residue left after discharge of the slurry, which residue may not be as readily dissolvable as the portion that has been removed in the slurry, but since the amount of residue is relatively small, whereas the amount of rinse is comparatively large, there is no opportunity for the formation of difficultly dissolvable aggregates or large balls. Thus the rinses serve the purpose of accelerating the dissolution of the more difficultly dissolvable portions, while preventing them from forming large balls, and at the same time the final rinse prepares the xanthator with a film of substantially the same or higher alkali concentration than that of the alkali cellulose crumbs from which the next batch of xanthate is to be produced, thereby preventing any reduction of reactivity that might otherwise result from decrease of alkali content in the next batch of raw material introduced into the xanthator.

The amount of caustic solution used in any particular rinse is not critical, but where several rinses are used in succession, it is preferred to have the volume of the first rinse or rinses less than that of the final rinse, and this is particularly true in such cases as make use of water or of lower concentrations of caustic in the preliminary rinses. The rinses are preferably done relatively quickly, so that the slurry they produce can again be quickly subjected to disintegration before there is any opportunity to form substantial aggregates. For example, a preliminary rinse with from 50 to 300 pounds of caustic solution can be performed in a period of about 1 to 5 minutes. Intermediate rinsings may take the same time, whereas the last rinse, or if there is only one rinse, that rinse, may be performed in a period of time up to but not exceeding the order of 20 to 30 minutes.

During the time of rinsing, the slurry first discharged from the xanthator is undergoing further dispersing action while being agitated in the mixer. As stated above, the slurrying in water reduces the tendency to develop adhesiveness and resulting aggregates, and in addition any aggregates formed are disintegrated in an incipient stage during transfer of the slurry into the mixer. The disintegration is accomplished on the entire mass of slurry so there is no opportunity for portions of the slurry to escape and develop aggregates. It is only after the preliminary slurrying and disintegration in a condition of low adhesiveness that additional caustic is introduced into the mixer by discharge of the rinses from the xanthator. Such additional caustic slurries are again subjected to complete disintegration, so that the suspended material therein is thoroughly exposed to the dissolving and dispersing action of the mixer. Preferably, several rinses are used, the first being either of water or of a low concentration of alkali, or, if of high concentration, of small volume compared to the volume of slurry already in the mixer so that the alkali concentration of the slurry in the mixer is only gradually increased, thus preventing the development of the severe adhesiveness which normally accompanies the direct addition of the desired amount of caustic solution to produce the final composition of viscose desired.

As an illustrative example of the invention, a batch of alkali cellulose xanthate is produced by the action of carbon disulfide upon an alkali cellulose having a caustic content of 17% in a xanthator of the type shown in the drawing and consisting of a vessel 2 in which agitating paddles 3 are rotated, a manhole 4 being provided to admit the crumbs and valves 5 and 6 being provided to introduce $CS_2$, to effect evacuation, and to introduce other chemicals, such as the water and caustic soda solutions. After evacuation of the excess carbon disulfide, water is introduced, such as through the valve 6, in an amount of about 250 pounds to 1,000 pounds of xanthate. The addition of water and production of the slurry requires a period of about 15 minutes, after which a dump valve 7 is opened which causes discharge of the slurry through a disintegrator 8 which may be of the attrition type shown in Davidson U. S. application Serial No. 547,204, filed July 29, 1944, now abandoned. A motor 9 serves to drive the attrition mill 8 and the disintegrated slurry is forced through the pipe 10 into a mixer 11, where it is agitated, such as by a mechanical agitator 12 of any suitable construction. It is clear that other types of xanthating vessels, disintegrators and mixers may be used. As shown, gravity is relied upon to produce flow through the disintegrator but a pump may be used instead or in addition.

After the discharge of the water slurry, a rinse of about 50 to 100 pounds of 20% caustic per 1,000 pounds of xanthate is introduced in the vessel 2 and after a couple of minutes' agitation, is passed through the disintegrator into the mixer 11. This rinse is repeated with the same amount of the same caustic solution one or more times, after which the final rinse containing the balance of a 20% caustic solution needed to give the desired viscose solution composition is introduced and allowed to be agitated for a somewhat longer period and finally discharged through the disintegrator into the mixer. The total time consumed for rinsing is about 30 minutes and after the last rinse is introduced into the mixer 11, a period of one hour to one and a half hours is generally sufficient to complete the dispersion into a uniform relatively easily filtered viscose having a low fiber count.

Whereas it has heretofore been suggested to accomplish xanthation and dissolution in a single vessel, such procedure has the disadvantages of requiring a special cleaning of the xanthator after each batch of viscose solution is produced. By the present invention solution in the xanthator does not proceed to such an extent as to make it difficult to remove the viscose therefrom. It is removed in the form of a slurry of which relatively little can stick to the walls of the vessel because of the fact that the great bulk is removed in the water slurry and the small residues that are handled in the rinses form extremely dilute dispersions. Therefore, the rinses of the present invention eliminate the necessity to provide a special cleaning operation and the time spent in rinsing proportionately reduces the time needed for dissolution in the mixer. In addition, by utilizing the xanthator for the formation of a slurry, the necessity to transfer the crumbs by hand labor or special mechanical unloading and transporting devices is eliminated, the slurry merely flowing by gravity or under the action of a pump through the disintegrator into the mixer. The xanthator-disintegrator-dissolver unit shown in the drawing for performing the present invention is an integral co-operating system, the time required for xanthating in the xanthator corresponding approximately to the final dissolution time required in the dissolver or mixer and in the intervening time both vessels are co-operating with the disintegrator to accomplish preliminary treatments which greatly facilitate and accelerate the final dissolution to a uniform filterable dispersion. Thus the procedure of the present invention increases the efficiency of the production of viscose solutions by reducing labor, equipment, power consumption and space, and by eliminating waste of cellulose formerly flushed to sewer.

While a single attritor is shown in the drawing, two or more may be hooked in series or in parallel between the churn and mixer shown. It is to be understood that a single attrition mill or attrition system may be hooked up so that it can serve a plurality of xanthate vessels and a plurality of dissolving vessels, the disintegrating system being operatively associated by the turning of suitable valves provided alternately with the various xanthator dissolver units. As another alternative, two xanthators may be connected by a single disintegrator or disintegrating system to a single dissolver, in which case the dissolver may be made large enough to accommodate the contents of both xanthators or the time of dissolution may be shortened so its period is one-half that of xanthation. These modifications are suggested to indicate clearly that the invention may be performed in other forms of apparatus besides those shown, though as has been stated hereinabove, the xanthator-disintegrator-dissolver unit shown in the drawing represents a preferred arrangement of apparatus.

It is to be understood that changes and variations may be made without departing from the spirit and scope of the invention as defined in the appended claims.

I claim:

1. A process of preparing viscose solutions comprising reacting carbon disulfide with alkali cellulose containing about 12 to 20% caustic alkali in a vessel, forming in the same vessel a slurry of the resulting cellulose xanthate in water, discharging the slurry except for a small residue into a separate dissolving vessel, then introducing in successive steps aqueous sodium hydroxide solutions each having a concentration between about 12 to 35% and at least the last thereof having a higher proportion of caustic than that of the alkali cellulose into the first vessel and forming a slurry with the residue therein, discharging the resulting slurry into the dissolving vessel, agitating the contents of the dissolving vessel to form a viscose dispersion of the desired composition, introducing carbon disulfide and additional of the alkali cellulose into the first vessel, and repeating the process.

2. A process of preparing viscose solutions comprising reacting carbon disulfide with alkali cellulose containing about 12 to 20% caustic alkali in a vessel, forming in the same vessel a slurry of the resulting cellulose xanthate in water, discharging the slurry except for a small residue into a separate dissolving vessel, then introducing in successive portions an aqueous sodium hydroxide solution having about 20% concentration into the first vessel and forming a slurry with the residue therein, discharging the resulting slurry into the dissolving vessel, agitating the contents of the dissolving vessel to form a viscose dispersion of the desired composition, introducing carbon disulfide and additional of the alkali cellulose into the first vessel, and repeating the process.

MICHAEL GOLBEN.

REFERENCES CITED

The following references are of record in the file of this patent:

UNITED STATES PATENTS

| Number | Name | Date |
| --- | --- | --- |
| 2,338,196 | Nash | Jan. 4, 1944 |

OTHER REFERENCES

Ott, "Cellulose and Its Derivatives," 1943, pages 712–713 (2 pages).